US012766740B2

(12) United States Patent
Shi et al.

(10) Patent No.: US 12,766,740 B2
(45) Date of Patent: Oct. 20, 2026

(54) METHOD, DEVICE AND COMPUTER READABLE MEDIA FOR USE WITH ROBOT

(71) Applicant: ABB SCHWEIZ AG, Baden (CH)

(72) Inventors: Zhuo Shi, Shanghai (CN); Yizhi Chen, Shanghai (CN); Bojun Ma, Shanghai (CN); Xiuxiu Yin, Shanghai (CN)

(73) Assignee: ABB Schweiz AG, Baden (CH)

( * ) Notice: Subject to any disclaimer, the term of this patent is extended or adjusted under 35 U.S.C. 154(b) by 2 days.

(21) Appl. No.: 18/983,744

(22) Filed: Dec. 17, 2024

(65) Prior Publication Data

US 2025/0114947 A1 Apr. 10, 2025

Related U.S. Application Data

(63) Continuation of application No. PCT/CN2022/101041, filed on Jun. 24, 2022.

(51) Int. Cl.
*B25J 13/08* (2006.01)

(52) U.S. Cl.
CPC .................................. *B25J 13/085* (2013.01)

(58) Field of Classification Search
CPC ...... B25J 9/1692; B25J 9/1694; B25J 13/085; G05B 2219/36429; G05B 2219/39022; G05B 2219/39529; G05B 2219/40599
See application file for complete search history.

(56) References Cited

U.S. PATENT DOCUMENTS 9,114,530 B2 * 8/2015 Tsusaka ............... G05B 19/423
10,406,644 B2 * 9/2019 Kunihiro ................ B25J 13/085
2015/0105907 A1 * 4/2015 Aiso ...................... B25J 9/1633 901/47
2015/0336268 A1 11/2015 Payton et al.
2019/0248006 A1 * 8/2019 Takahashi ............ G05B 19/421
2021/0197371 A1 * 7/2021 Huang ................... B25J 13/085
2021/0323148 A1 10/2021 Matsuda et al.

FOREIGN PATENT DOCUMENTS

CN 105082132 A 11/2015
CN 110154018 A 8/2019
CN 112384341 A 2/2021
JP 2013082049 A 5/2013
JP 2014124734 A 7/2014

* cited by examiner

*Primary Examiner* — Dalena Tran
(74) *Attorney, Agent, or Firm* — Whitmyer IP Group LLC

(57) ABSTRACT

Embodiments of the present disclosure relate to a method, a device and a computer readable media for use with robot. The robot has at least one arm. The method includes receiving a force applied onto a force sensor attached at an end of the arm; determining a first vector from the force sensor; determining a second vector based on a torque of a joint of the robot, the joint being coupled to the arm; and determining a transformation relation between the first vector and the second vector.

19 Claims, 3 Drawing Sheets

METHOD, DEVICE AND COMPUTER READABLE MEDIA FOR USE WITH ROBOT

CROSS-REFERENCE TO RELATED APPLICATIONS

This application claims priority to and is a continuation application of international patent application number PCT/CN2022/101041, filed on Jun. 24, 2022; which is herein incorporated by reference in its entirety.

FIELD

Example embodiments of the present disclosure generally relate to the field of industrial robots and, more particularly, to a method, a device and a computer readable media for determining a positional relation between a force sensor attached on an industrial robot and the end of the arm of the industrial robot.

BACKGROUND

A robot can be used in various fields. For example, the robot may be controlled to assist in handling a workpiece. For some robot, the users desire that it can be dragged to a predetermined position. For this purpose, a force sensor may be an option to assist in the moving of the robot. In particular, the force sensor may be mounted at an end of an arm of the robot. If the user hopes to move the robot to a desired position, he or she may operate an application for use with the robot. After the user inputs the desired location through the application, a controlling cabinet connected to the robot would communicate with the force sensor and actuate the arm of the robot according to the input to achieve such a movement.

In a conventional approach, in order to allow the application to accurately control the movement of the arm of the robot, the user must be aware of the positional relation between the force sensor and the end of the arm of the robot. This would be a huge problem for the users, especially for the new user without rich experience. Therefore, there is a need for an improvement of the method of determining such a positional relation.

SUMMARY

Example embodiments of the present disclosure propose a solution to at least address the problems in the prior art and/or potential problems.

In a first aspect, example embodiments of the present disclosure relate to a method for use with a robot. The robot comprises at least one arm, the method comprising: receiving a force applied onto a force sensor attached at an end of the arm; determining a first vector from the force sensor; determining a second vector based on a torque of a joint of the robot, the joint being coupled to the arm; and determining a transformation relation between the first vector and the second vector.

According to example embodiments of the present disclosure, the user can use computer to determine the transformation relation can be achieved automatically. Therefore, the robot can be handled by more users, no matter whether the user knows how to calculate such a relation or not In some example embodiments, the method further comprising: issuing a first message to ask a user to apply a force onto the force sensor. With these example embodiments, in order to determine the positional relation between the force sensor and the end of the arms, the user only need to apply a force according to the message, without having the knowledge of the coordinate transformation between the force sensor and the end of robot arm.

In some example embodiments, determining the second vector comprises: determining the second vector further based on a relative offset of coordinates between the end of the arm and the force sensor. With these example embodiments, the transformation relation between the first vector and the second vector merely includes rotational relation, which would facilitate the calculation.

In some example embodiments, the first and second vectors each has three components; and wherein determining the transformation relation comprises determining a matrix having four components, wherein the first component is calculated based on the dot product and the lengths of the first and second vectors; and wherein the second, third and fourth components are calculated based on the cross product of the first and second vectors. With these example embodiments, a quaternion method, which having a rapid computational efficiency can be used.

In some example embodiments, the first vector and the second vector are unit vectors. With these example embodiments, the transformation relation can be calculated in an efficient manner.

In a second aspect, example embodiments of the present disclosure relate to a device for use with a robot. The robot comprises at least one arm and the device comprising: a force receiving module configured to receive a force applied onto a force sensor attached at an end of the arm; a first vector determining module configured to determine a first vector from the force sensor; a second vector determining module configured to determine a second vector based on a torque of a joint of the robot, the joint being coupled to the arm; and a relation determining module configured to determine a transformation relation between the first vector and the second vector.

In some example embodiments, the device further comprising: a message issuing module configure to issue a first message to ask a user to apply a force onto the force sensor.

In some example embodiments, the second vector determining module is further configured to determine the second vector further based on a relative offset of coordinates between the end of the arm and the force sensor.

In some example embodiments, the first and second vectors each has three components; and wherein determining the transformation relation comprises determining a matrix having four components, wherein the first component is calculated based on the dot product and the lengths of the first and second vectors; and wherein the second, third and fourth components are calculated based on the cross product of the first and second vectors.

In some example embodiments, the first vector and the second vector are unit vectors.

In a third aspect, example embodiments of the present disclosure relate to a computer-readable media having a computer program stored thereon, the computer program comprising code adapted to perform a method in the first aspect.

This Summary is provided to introduce a selection of concepts in a simplified form that are further described below in the Detailed Description. This Summary is not intended to identify key features or essential features of the present disclosure, nor is it intended to be used to limit the scope of the embodiments of the present disclosure.

BRIEF DESCRIPTION OF THE DRAWINGS

Through the following detailed description of the example embodiments of the present disclosure with reference to the accompanying drawings, the above and other objectives, features and advantages of the present disclosure will become more apparent. In the drawings, a plurality of embodiments of the present disclosure is explained in a non-restrictive manner by way of examples, wherein.

DETAILED DESCRIPTION OF EMBODIMENTS

Figure 1:
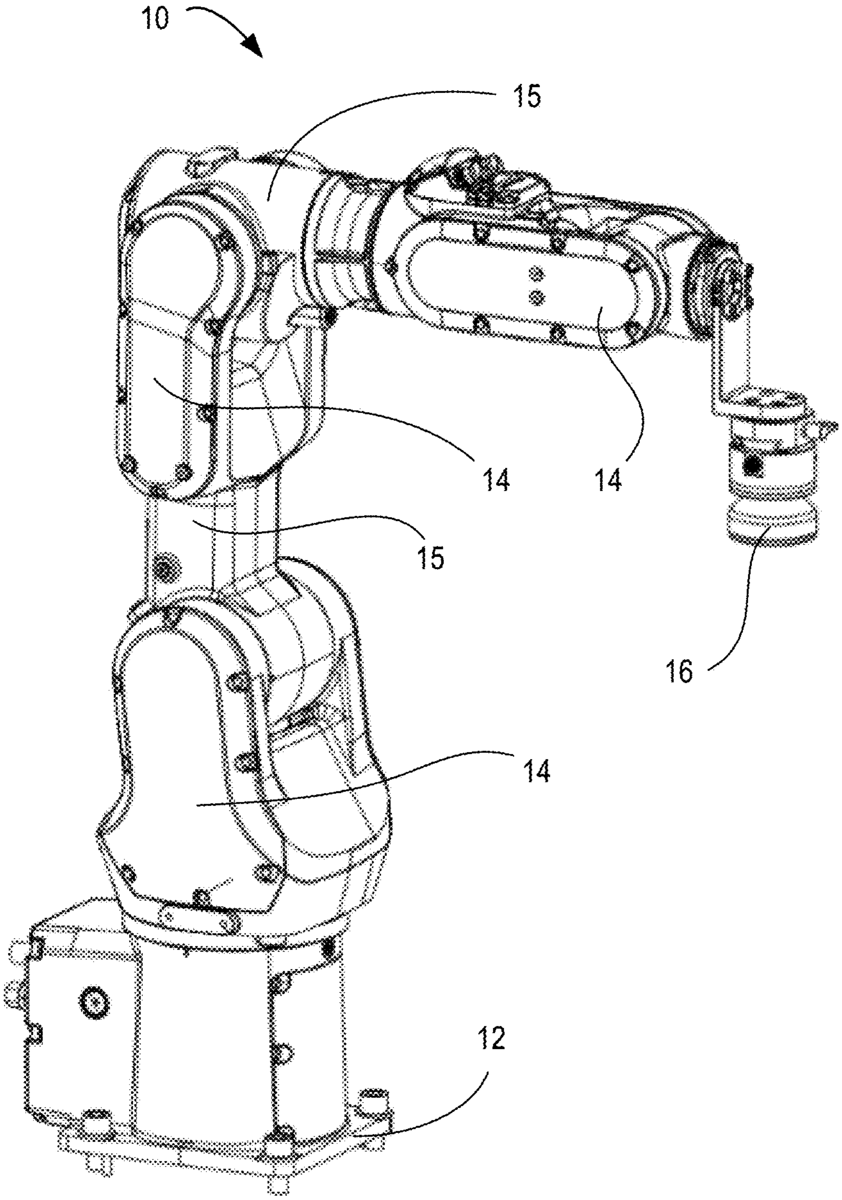
FIG. 1 illustrates an exemplary system in which example embodiments of the present disclosure may be implemented.

Principles of the present disclosure will now be described with reference to various example embodiments illustrated in the drawings. It should be appreciated that description of those embodiments is merely to allow those skilled in the art to better understand and further implement example embodiments disclosed herein and is not intended to limit the scope disclosed herein in any manner. It should be noted that similar or same reference signs can be used in the drawings when feasible, and similar or same reference signs can represent the similar or same functions. Those skilled in the art can readily recognize that alternative embodiments of the structure and method described herein can be employed from the following description without departing from the principles of the present disclosure described herein.

As used herein, the term "comprises" and its variants are to be read as open-ended terms that mean "comprises, but not limited to." The term "based on" is to be read as "based at least in part on." The terms "one embodiment" and "embodiment" are to be read as "at least one embodiment." The term "a further embodiment" is to be read as "at least a further embodiment." The terms "first", "second" and so on can refer to same or different objects. The following text also can include other explicit and implicit definitions. Definitions of the terms are consistent throughout the description unless the context indicates otherwise.

As mentioned above, in the conventional approaches of determining the spatial relations between the force sensor and the end of the arm of robot, the users must figure out such a relation by himself. The calculation of the spatial relations would be complicated for some users, especially the novice users. Worse still, in case that the installing position of the force sensor is changed, the relation should be calculated again and again, which increases a great burden for the users. Accordingly, the usage of the conventional approaches would be quite limited.

The embodiment will generally be described herein in the context of an industrial robot. It is to be understood that the type of the industrial robot would not be limited herein. The skilled artisan would envisage that the embodiments described herein can also be used in various kinds of industrial robot, for example, an industrial robot carrying out a welding operation of a workpiece, an industrial robot carrying out a machining operation, or an industrial robot carrying out a drilling operation of a workpiece, etc. It is to be understood that the embodiment described herein can also be used in other cases, which are already known or to be developed in the future, not listed in the text. Hereinafter, the industrial robot may be referred to as a robot.

At least to address the problem existed in the conventional approaches, the present disclosure proposes a solution, which allows an automatically and efficient calculation of the spatial relations between the force sensor and the end of the arm of robot. The solution according to the present disclosure will not ask the users to calculate the spatial relations, but will do the calculation for them. Example embodiments will be described in more detail hereinafter in accordance with FIGS. 1-3.

FIG. 1 illustrates an exemplary robot 10 in which example embodiments of the present disclosure may be implemented. The robot 10 as illustrated may be a multiple-axis robot which comprises one or more arms 14 coupled to a base 12. The arms 14 are actuated to perform a particular action according to the instruction from a user interface (not shown) coupled to the robot 10. The user interface facilitates the operation of the user as well as the interaction between the user and the robot 10. The end of the arm 14 may be attached with a workpiece (not shown) to be handled. The workpiece may be actuated by the arm 14 to any desired position. For example, the arms 14 of the robot 10 may be controlled to conduct a predetermined operation to the workpiece on a transmission belt (not shown).

As illustrated, a force sensor 16 may be attached at another place of the end of the arm 14 other than the workpiece. The force sensor 16 is an element to sense the force applied onto the arm 14. Generally speaking, the force sensor 16 is an apparatus to convert the force value to a related electrical signal, which can be output and measured. In some example embodiments, the force sensor 16 may be of a three-dimensional type, that is, the force sensor 16 may be used to sense the force in three dimensions. As the force changes, the electrical signal changes accordingly and therefore can be measured to calculate the force value. It is to be understood that the working principle of the force sensor 16 is only illustrative but not limited to this regard. According to the actual need of the scenario, the type of the force sensor 16 can be changed accordingly.

Figure 2:
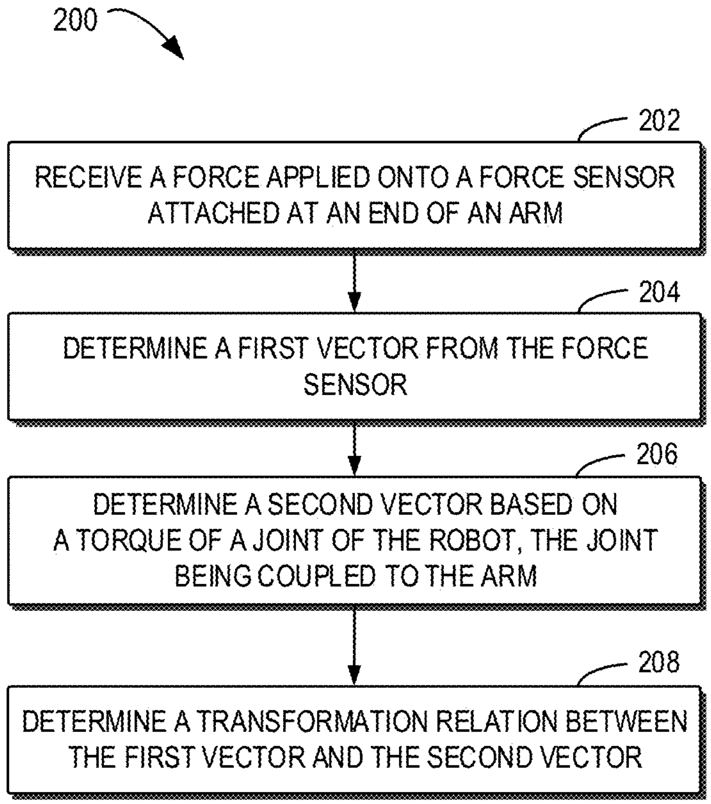
FIG. 2 illustrates a flowchart of a method in accordance with an example embodiment of the present disclosure.

FIG. 2 illustrates a flowchart of a method 200 in accordance with an example embodiment of the present disclosure. The method 200 may be carried out by a controller connected to the robot 10.

At block 202, a force is applied onto the force sensor 16 of the robot 10. The force may be applied from the user. In some example embodiments, the controller may be configured to issue a first message to ask the user to apply such a force onto the force sensor 16. The user can apply the force at any direction. The magnitude of the force is not limited and can be decided by the user himself, as long as such a magnitude would not exceed the maximum force limit value that the sensor can bear. It should be appreciated that even though the force is applied onto the force sensor 16, the force would not make the robot 10 move. That is, the robot 10 is still kept stationary under the applied force.

At block 204, a first vector $\vec{v_1}$ is determined from the force sensor 16. The force sensor 16 may include a configuration page, on which the magnitude and the direction of the applied force may be obtained. The first vector $\vec{v_1}$ may be used to indicate the magnitude and the direction of the force applied onto the force sensor 16. In some example embodiments, the first vector $\vec{v_1}$ may include three components, for example, $\vec{v_1}=(a_1, b_1, c_1)$. The proportional relations among the components $a_1$, $b_1$, $c_1$ indicates the directions of the force, while the values of the components $a_1$, $b_1$, $c_1$ indicates the magnitude of the applied force. In some further example embodiments, the values of the applied force may be displayed on a screen connected to the robot 10 and the user should keep an eye on whether the values exceed the force ranges of the force sensor 16. In further example embodiments, the controller may monitor the values of the applied force. In case that the values of the force is greater than the maximum force limit value of the force sensor 16, the controller may issue an alarm to ask the user to apply a smaller force that the force sensor 16 can bear. It should be appreciated that the robot 10 is still kept stationary when determining the first vector $\vec{v_1}$.

At block 206, a second vector $\vec{v_2}$ is determined based on a torque of a joint 15 of the robot 10. In some example embodiments, the second vector $\vec{v_2}$ may be calculated based on the collected data from the torque values from the joint as well as the weight and length of the arm 14 of the robot 10. In some example embodiments, the second vector $\vec{v_2}$ may also be calculated based on the relative offset of the coordinates between the end of the arm 14 and the force sensor 16. In some example embodiments, the second vector $\vec{v_2}$ may also include three components, for example, $\vec{v_2}=(a_2, b_2, c_2)$. Any existing approach or the method to be developed in the future can be used to determine the components of the second vector $\vec{v_2}$. It should be also appreciated that the robot 10 is still kept stationary when determining the second vector $\vec{v_2}$.

At block 208, a transformation relation between the first vector $\vec{v_1}$ and the second vector $\vec{v_2}$ is determined. As discussed above, the first vector $\vec{v_1}$ and the second vector $\vec{v_2}$ are calculated from two different routes to reflect the magnitude and the direction of the force applied onto the force sensor 16 and the positional relation between the force sensor and the end of the arm 14 of the robot 10 can be determined by obtaining the transformation relation between the first vector $\vec{v_1}$ and the second vector $\vec{v_2}$. In the case that the second vector $\vec{v_2}$ is calculated based on the relative offset of the coordinate between the end of the arm 14 and the force sensor 16, the second vector $\vec{v_2}$ can be calculated as a vector with the origin defined at the force sensor 16. Therefore, the transformation relation between the first vector $\vec{v_1}$ and the second vector $\vec{v_2}$ merely includes rotational relation, which would facilitate the calculation.

The user may use a variety of method to calculate the transformation relation between the first vector $\vec{v_1}$ and the second vector $\vec{v_2}$. In some example embodiments, the use may use the quaternion to calculate such a transformation relation. In further example embodiments, the use may use the rotational matrix to calculate the transformation relation. It should be appreciated that the method mentioned here are only illustrative but not restrictive. Other methods can be used according to the complexity of the calculation, for example, the eulerian angle.

The calculating method of the quaternion will be described hereinafter in detail. It is to be understood that the steps described below are only one of the possible approaches. The example calculations of the quaternion are described on the scenario where the first vector $\vec{v_1}$ and the second vector $\vec{v_2}$ each has the three components. In such a scenario, the quaternion q includes four components $q_1$, $q_2$, $q_3$ and $q_4$. First, the first vector $\vec{v_1}$ and the second vector $\vec{v_2}$ should be converted into unit vectors $\overrightarrow{v_{1U}}$ and the second vector $\overrightarrow{v_{2U}}$, respectively.

The first component $q_1$ can be calculated based on the dot product and the lengths of the first vector $\overrightarrow{v_{1U}}$ and the second vector $\overrightarrow{v_{2U}}$. For example, the first component $q_1$ can be calculated as below:

$$q_1 = \sqrt{(\overrightarrow{v_{1U}}.\text{length})^2 * (\overrightarrow{v_{2U}}.\text{length})^2} + dotproduct(\overrightarrow{v_{1U}}, \overrightarrow{v_{2U}})$$

wherein $\overrightarrow{v_{1U}}$. length indicates the length of the first vector $\overrightarrow{v_{1U}}$ and $\overrightarrow{v_{2U}}$. length indicates the length of the second vector $\overrightarrow{v_{2U}}$.

Next, the second, third the fourth components $q_2$, $q_3$ and $q_4$ can be calculated by calculating the cross product of the first vector $\overrightarrow{v_{1U}}$ and the second vector $\overrightarrow{v_{2U}}$. as below:

$$(q_2, q_3, q_4) = crossproduct(\overrightarrow{v_{1U}}, \overrightarrow{v_{2U}})$$

Finally, the quaternion q can be obtained by normalizing the matrix consisted of the four components $q_1$, $q_2$, $q_3$ and $q_4$.

In another aspect, example embodiments of the present disclosure relate to a device for use with a robot. The device comprising: a force receiving module configured to receive a force applied onto a force sensor attached at an end of the arm; a first vector determining module configured to determine a first vector from the force sensor; a second vector determining module configured to determine a second vector based on a torque of a joint of the robot, the joint being coupled to the arm; and a relation determining module configured to determine a transformation relation between the first vector and the second vector.

In some example embodiments, the device further comprises a message issuing module configure to issue a first message to ask a user to apply a force onto the force sensor.

In some example embodiments, the second vector determining module is further configured to determine the second vector further based on a relative offset of coordinates between the end of the arm and the force sensor.

In some example embodiments, the first and second vectors each has three components; and wherein determining the transformation relation comprises determining a matrix having four components, wherein the first component is calculated based on the dot product and the lengths of the first and second vectors; and wherein the second, third and fourth components are calculated based on the cross product of the first and second vectors.

In some example embodiments, the first vector and the second vector are unit vectors.

In a still further aspect, example embodiments of the present disclosure relate to a computer-readable media having a computer program stored thereon, the computer program comprising code adapted to perform a method described above.

Compared with the conventional approaches, the example embodiments according to the present disclosure does not require the user to have professional skill as to calculate the positional relation between the force sensor and the end of the arm 14 of the robot 10. The users only need to apply a force onto the force sensor 16. All the computations are automatically carried out by the controller connected to the robot 10, which not only improves the user experience, but also improves the calculation efficiency.

Figure 3:
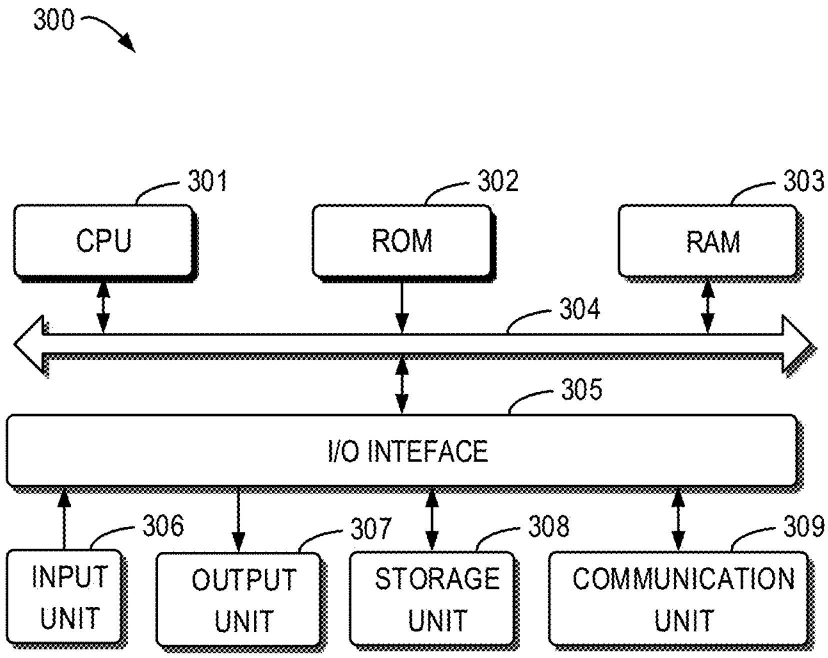
FIG. 3 is a schematic block diagram illustrating a device that may be used to implement embodiments of the present disclosure.

FIG. 3 is a schematic diagram illustrating a device 300 that may be used to implement embodiments of the present disclosure. As illustrated, the device 300 includes a central processing unit (CPU) 301, which may execute various appropriate actions and processing based on the computer program instructions stored in a read-only memory (ROM) 302 or the computer program instructions loaded into a random access memory (RAM) 303 from a storage unit 308. The RAM 303 also stores all kinds of programs and data required by operating the storage device 300. CPU 301, ROM 302 and RAM 303 are connected to each other via a bus 304 to which an input/output (I/O) interface 305 is also connected.

A plurality of components in the device 300 are connected to the I/O interface 305, including: an input unit 306, such as keyboard, mouse and the like; an output unit 307, such as various types of displays, loudspeakers and the like; a storage unit 308, such as the magnetic disk, optical disk and the like; and a communication unit 309, such as network card, modem, wireless communication transceiver and the like. The communication unit 309 allows the device 300 to exchange information/data with other devices through computer networks such as Internet and/or various telecommunication networks.

Each procedure and processing described above may be executed by a processing unit 301. For example, in some embodiments, the method may be implemented as computer software programs, which are tangibly included in a machine-readable medium, such as storage unit 308. In some embodiments, the computer program may be partially or completely loaded and/or installed to the device 300 via ROM 302 and/or the communication unit 309. When the computer program is loaded to RAM 303 and executed by CPU 301, one or more steps of the above described method 200 are implemented.

In some embodiments, the method 200 described above may be implemented as a computer program product. The computer program product may include a computer-readable storage medium loaded with computer-readable program instructions thereon for executing various aspects of the present disclosure.

The computer-readable storage medium may be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via Internet, local area network, wide area network and/or wireless network. The network may include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages including object-oriented programming languages and conventional procedural programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

What is claimed is:

1. A method for use with a robot, the robot comprising at least one arm, the method comprising:

receiving, by a controller, an electrical signal output by a force sensor corresponding to a force applied onto the force sensor attached at an end of the arm, wherein the electrical signal corresponds to the force applied to the force sensor while the robot is kept stationary under the force applied;

determining, by the controller, a first vector from the electrical signal output by the force sensor while the robot is kept stationary;

determining, by the controller, a second vector based on data representing torque values of a joint of the robot, the joint being coupled to the arm while the robot is kept stationary;

determining, by the controller, a transformation relation between the first vector and the second vector; and determining, by the controller, based on the transformation relation, a positional relation between the force sensor and the end of the arm.

2. The method of claim 1, further comprising:

issuing a first message to ask a user to apply a force onto the force sensor.

3. The method of claim 2, wherein determining the second vector comprises: determining the second vector further based on a relative offset of coordinates between the end of the arm and the force sensor.

4. The method of claim 2, wherein the first and second vectors each has three components; and wherein determining the transformation relation comprises determining a matrix having four components, wherein the first component is calculated based on a dot product and lengths of the first and second vectors; and wherein second, third, and fourth components are calculated based on a cross product of the first and second vectors.

5. The method of claim 1, wherein determining the second vector comprises:

determining the second vector further based on a relative offset of coordinates between the end of the arm and the force sensor.

6. The method of claim 5, wherein the first and second vectors each has three components; and wherein determining the transformation relation comprises determining a matrix having four components.

7. The method of claim 6, wherein the first vector and the second vector are unit vectors.

8. The method of claim 1, wherein the first and second vectors each has three components; and wherein determining the transformation relation comprises determining a matrix having four components, wherein the first component is calculated based on a dot product and lengths of the first and second vectors; and wherein second, third, and fourth components are calculated based on a cross product of the first and second vectors.

9. The method of claim 8, wherein the first vector and the second vector are unit vectors.

10. A non-transitory computer-readable storage medium having a computer program stored thereon, the computer program comprising code adapted to perform the method of claim 1.

11. A device for use with a robot, the robot comprising at least one arm, the device comprising:

a controller connected to the robot, the controller configured to:

receive an electrical signal output by a force sensor corresponding to a force applied onto the force sensor attached at an end of the arm, wherein the electrical signal corresponds to the force applied to the force sensor while the robot is kept stationary under the force applied;

determine a first vector from the electrical signal output by the force sensor while the robot is kept stationary;

determine a second vector based on data representing torque values of a joint of the robot, the joint being coupled to the arm while the robot is kept stationary; and determine a transformation relation between the first vector and the second vector; and determine, based on the transformation relation, a positional relation between the force sensor and the end of the arm.

12. The device of claim 11, wherein the controller is configured to issue a first message to ask a user to apply a force onto the force sensor.

13. The device of claim 12, wherein the controller is further configured to determine the second vector further based on a relative offset of coordinates between the end of the arm and the force sensor.

14. The device of claim 12, wherein the first and second vectors each has three components; and wherein determining the transformation relation comprises determining a matrix having four components, wherein the first component is calculated based on a dot product and lengths of the first and second vectors; and wherein second, third, and fourth components are calculated based on a cross product of the first and second vectors.

15. The device of claim 11, wherein the controller is further configured to determine the second vector further based on a relative offset of coordinates between the end of the arm and the force sensor.

16. The device of claim 15, wherein the first and second vectors each has three components; and wherein determining the transformation relation comprises determining a matrix having four components, wherein the first component is calculated based on a dot product and lengths of the first and second vectors; and wherein second, third, and fourth components are calculated based on a cross product of the first and second vectors.

17. The device of claim 16, wherein the first vector and the second vector are unit vectors.

18. The device of claim 11, wherein the first and second vectors each has three components; and wherein determining the transformation relation comprises determining a matrix having four components, wherein the first component is calculated based on a dot product and lengths of the first and second vectors; and wherein second, third, and fourth components are calculated based on a cross product of the first and second vectors.

19. The device of claim 18, wherein the first vector and the second vector are unit vectors.

* * * * *